May 17, 1932.  T. A. HOOVER  1,858,930
VEHICLE SUSPENSION
Filed Aug. 7, 1929
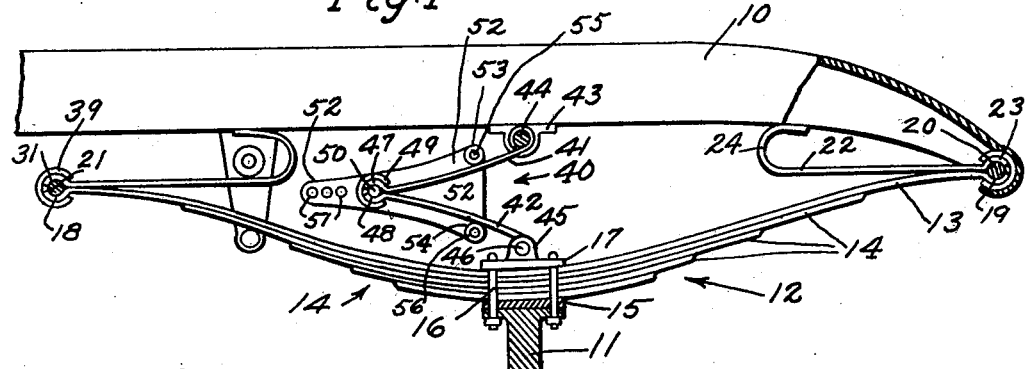
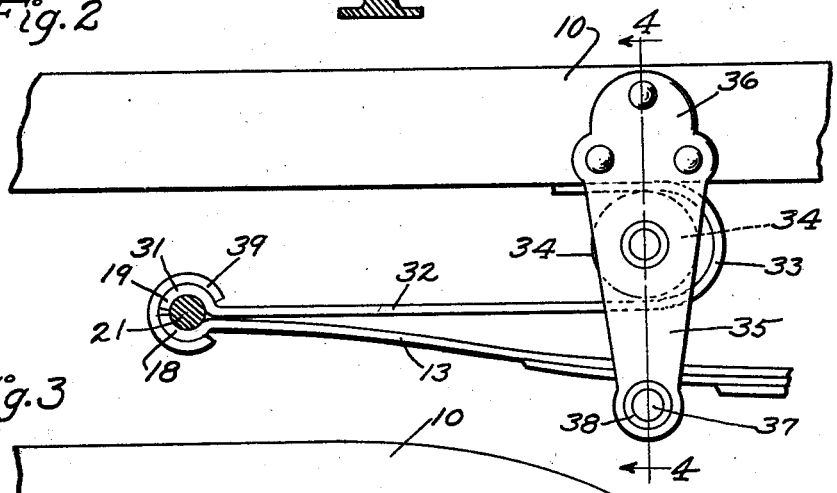
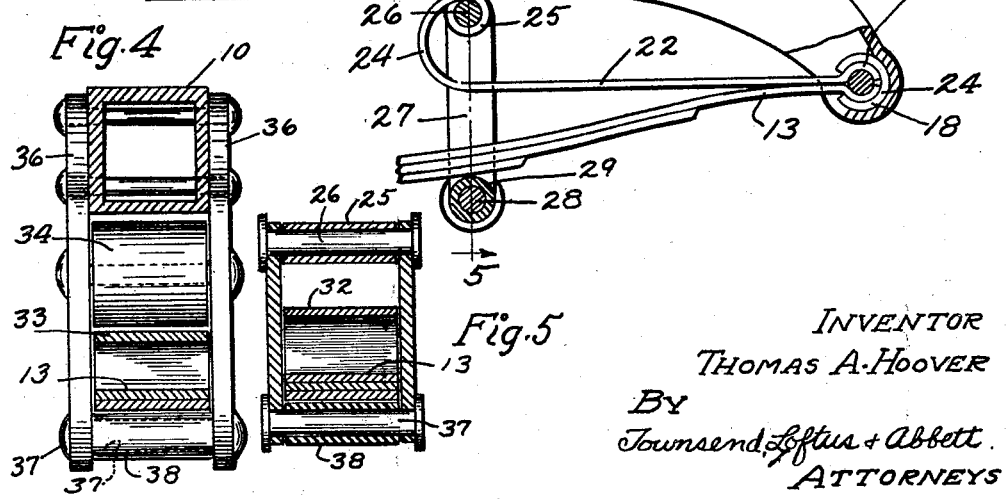
INVENTOR
THOMAS A. HOOVER
BY
Townsend, Loftus & Abbett.
ATTORNEYS Patented May 17, 1932

1,858,930

UNITED STATES PATENT OFFICE

THOMAS A. HOOVER, OF OAKLAND, CALIFORNIA, ASSIGNOR OF ONE-THIRD TO AUGUSTUS L. HOOVER, OF LOS ANGELES, CALIFORNIA, ONE-THIRD TO ISABEL BENSBERG, OF LOS GATOS, CALIFORNIA, AND ONE-THIRD TO ELMA PUTNAM, OF OAKLAND, CALIFORNIA

VEHICLE SUSPENSION

Application filed August 7, 1929. Serial No. 384,141.

This invention relates to a vehicle spring suspension.

It is a principal object of the present invention to provide a spring suspension for vehicles which will make it possible to use a minimum weight spring, and which also embodies means whereby varying loads and road shock may be accommodated by the spring and the rebound of the spring adjustably controlled.

The invention contemplates the use of a semi-elliptical spring, having spring eyes at its opposite ends and auxiliary spring connections whereby the load of a vehicle spring may be directly imposed upon the spring rather than upon the spring eyes; the structure further providing a rebound spring adapted to be adjustably set to flex and rebound under a desired pressure.

The invention is illustrated by way of example in the accompanying drawings, in which:

Fig. 1 is a view in side elevation showing a fragmentary portion of a vehicle frame and the spring with which the present invention is concerned, mounted thereon.

Fig. 2 is an enlarged fragmentary view of the rear spring eye and the associated spring parts.

Fig. 3 is an enlarged fragmentary view showing the front spring eye and the associated parts.

Fig. 4 is a view in transverse section through the structure as seen on the line 4—4 of Fig. 2.

Fig. 5 is a view in transverse section of the spring structure as seen on the line 5—5 of Fig. 3.

Referring more particularly to the drawings, 10 indicates the frame of a vehicle such as an automobile, and 11 indicates the axle of the vehicle, such as the front axle. Interposed between the frame and the axle is a spring structure 12 with which the present invention is particularly concerned. This spring is shown as being a semi-elliptical spring, having a main leaf 13, and a plurality of graduated spring leaves 14 arranged therebeneath in a spring bundle. The entire spring bundle is secured upon a spring seat 15 of the axle, and is held by spring bolts 16 which pass through the spring seat and a spring pad 17.

The opposite ends of the main leaf 13 may be constructed with cylindrical eyes for receiving spring bolts. However, as shown particularly in Figs. 2 and 3 of the drawings, it will be seen that the ends of the main leaf 13 are formed with semi-cylindrical portions 18 and 19. These portions hook beneath the spring bolts 20 and 21 and serve as seats for these bolts, and also serve to thus be disposed beneath the load and to support the same in a manner to be hereinafter described.

The spring bolt 20 extends through the eye of the frame horn 10 and is suitably secured in position by a nut, or other fastening means. Disposed over the bolt is an auxiliary spring leaf 22. This leaf is formed with a semi-cylindrical portion 23, at its outer end as clearly shown in Fig. 3 of the drawings. A cylindrical spring clip 24 embraces the semi-cylindrical portion 19 of the main leaf 13 and the semi-cylindrical portion 23 of the auxiliary leaf 22, and holds these members in clamped position around the spring bolt 20. The auxiliary leaf 22 extends rearwardly and substantially horizontally for a distance, representing a fraction of the distance from the front spring bolt 20 to the vertical median line of the spring 12. The auxiliary spring 22 terminates at its rear end in an upwardly curved loop 24, which terminates in an eye 25. The eye 25 receives a shackle bolt 26. This bolt passes through shackles 27, which are disposed on the opposite sides of the auxiliary spring 22, and extend downwardly upon opposite sides of the spring 12. Disposed at the lower ends of the shackles 27 and the spring 12 is a connecting shackle bolt 28, which carries a resilient bushing 29. The outer diameter of the bushing 29 is such as to insure that upon rebound of the spring structure the resilient bushing 29 will engage the under face of the spring bundle, and will tend to cause the semi-elliptical spring to resist violent upward movement of the frame.

In some instances the shackles may be eliminated, as shown in Fig. 1 of the drawings, and the auxiliary spring will thus be simplified by eliminating the eye 25.

The upturned loop 24 of the auxiliary spring 22 will in that particular case rest against the underface of the frame member 10, and will tend to resist upward movement of the auxiliary spring, and to cause the loop 24 to flex as force is imparted against it from the main leaf 13 of the semi-elliptical spring.

The rear end of the semi-elliptical spring is provided, as previously described, with a semi-cylindrical portion 18, which passes beneath the rear spring bolt 21. This bolt is not connected with shackles as is usually the case when semi-elliptical springs are installed at the forward end of an automobile frame, but the bolt is held in its seated position with relation to the semi-cylindrical portion 18 of the main leaf 13, and is held in this position by a semi-cylindrical portion 31, formed at the end of a rear auxiliary spring 32. The rear auxiliary spring extends horizontally above the main leaf 13 of the semi-elliptical spring, and terminates at its forward end in a loop 33. This loop extends upwardly and rearwardly, and rests against the frame 10 along its upper horizontal portion. The loop embraces a roller 34, which is carried between bracket arms 35. These arms are secured to the frame by bolting flanges 36. The arms extend downwardly along opposite sides of the rear auxiliary sping 32 and the semi-elliptical spring 12, as shown in Fig. 4 of the drawings. The lower ends of the arms carry a transversely extending bolt 37, upon which is mounted a resilient snubber bushing 38. This bushing is disposed beneath the spring bundle of the semi-elliptical spring 12, and when there is a tendency for a violent upward movement of the frame the bushing will strike the under side of the semi-elliptical spring and its upward movement will be resisted by the flexure of the spring.

The semi-cylindrical ends 18 and 31 of the main leaf and the rear auxiliary spring, respectively, are secured in their assembled positions, around the rear spring bolt 30 by a cylindrical spring clip 39. Due to this arrangement it is also possible, for the auxiliary rear spring 32 to resist downward movement of the spring structure, since the upper horizontal portion of the loop of the spring 32 passes over the roller 34, and will tend to catch the auxiliary spring and prevent it from moving downwardly.

It will be particularly noted that this spring construction eliminates the use of a spring shackle at the rear of the vehicle, and interposes a resilient member between the rear spring eye of the semi-elliptical spring and the vehicle frame, thus giving greater flexibility, and at the same time providing snubbing action when the spring is violently flexed in either an upwardly or a downwardly direction.

As shown in Fig. 1 of the drawings, an auxiliary spring snubber is provided. This constitutes a V-shaped spring structure 40, having an upper arm 41 and a lower arm 42. The upper arm is secured to a bracket 43 by a bolt 44. The bracket 43 is suitably fastened to the under face of the frame 10. The lower arm 42 is secured to a boss 45 by a bolt 46. The boss 45 is here shown as formed integral with the pad 17 of the spring. The arms 41 and 42 are of flat spring steel, thus giving considerable resilience. The rear end of each arm is formed with semi-cylindrical portions 47 and 48 respectively. These portions agree in construction with the eye structures shown in Figs. 2 and 3 of the drawings. A resilient cylindrical clip 49 holds these ends of the spring leaves 41 and 42 in assembled position around a bolt 50. The bolt 50 extends through one of a plurality of perforations 51 in an A-plate 52. Two of these plates are provided, one disposed on each side of the snubber unit 40, and being parallel in vertical plane.

The forward ends of the plate 52, carry rollers or fulcrums 53 and 54, which extend across the outer faces of the spring leaves 41 and 42, respectively. These rollers or fulcrums are spaced a considerable distance apart, and are mounted upon bolts 55 and 56, by which the plates 52 are secured together at their forward ends. The bolt 50 holds them in position with each other at their rear and narrow end. It will be evident that by shoving the bolts toward or way from the point of mounting of the spring leaves 41 and 42, upon the frame and semi-elliptical spring, respectively, that the degree of tension of the spring leaves 41 and 42 may be adjustably varied, and it is for this reason that the plurality of perforations 51 are provided, so that the bolt 50 may be moved forwardly or rearwardly in a desired perforation to thus change the relation of the rollers 53 and 54 with regard to the spring leaves 41 and 42.

In operation of the present invention the entire frame suspension structure is constructed and assembled as shown in Fig. 1 of the drawings. In designing the semi-elliptical spring bundle care is taken so that a minimum weight will occur in the spring structure, thus making a light, flexible spring possible. This light, flexible spring carries the normal weight of the load imposed upon the frame 10. The auxiliary leaves 22 and 32 are designed to build up additional strength and resiliency under extreme conditions of road shock and vibration and load. The looped portions 24 and 33 also add considerable resistance. It is intended that under normal conditions the auxiliary springs will not flex, and that all of the load will be carried on a light vibrating semi-elliptical spring coil.

In order to insure that the flexure of the semi-elliptical spring will not produce excessive rebound, the structure 40 is provided, and is adjustably set so that a desired spring opening will be established, and so that a desired rebound resistance will be obtained under certain conditions.

It will thus be seen that the spring here shown provides a relatively light spring, especially adapted for mounting at the forward end of an automobile axle, and permitting flexure and shock absorption without requiring the use of fixed spring shackles at the rear of the spring, and by which a considerable amount of shock would be transmitted to the vehicle frame rather than absorbed in the spring structure.

While I have shown the preferred form of my invention as now known to me, it will be understood that various changes might be made in the combination, construction and arrangement of all parts without departing from the spirit of the invention as claimed.

Having thus described my invention, what I claim and desire to secure by Letters Patent is:

1. A vehicle frame suspension comprising a semi-elliptical spring bundle mounted upon a vehicle axle, said bundle having an upper main leaf forming a spring eye at its forward end and a spring eye at its rear end, the main leaf having auxiliary springs oscillatably joined with said main leaf, said auxiliary leaves extending toward the vertical medial plane of said spring and terminating in recurved loops upon which a vehicle frame rests, means pivotally connecting the forward spring eye with the vehicle frame, and means confining the recurved loop of the rear auxiliary spring in articulate relation with the vehicle frame.

2. A vehicle frame suspension comprising a semi-elliptical spring bundle mounted upon a vehicle axle, said bundle having an upper main leaf forming a spring eye at its forward end and a spring eye at its rear end, the main leaf having auxiliary springs oscillatably joined with said main leaf, said auxiliary leaves extending toward the vertical medial plane of said spring and terminating in recurved loops upon which a vehicle frame rests, means pivotally connecting the forward spring eye with the vehicle frame, means confining the recurved loop of the rear auxiliary spring in articulate relation with the vehicle frame, and means associated with the vehicle frame adjacent the rear end of the spring bundle whereby rebound of the frame will be positively transmitted to the spring.

3. In a vehicle frame suspension a combination with the frame and a semi-elliptical spring disposed therebeneath, a rebound snubber comprising a spring member comprising complementary leaves converging and uniting at one end and lying in the same vertical plane with the semi-elliptical spring and the frame, the opposite ends of said rebound spring being pivotally connected to the pad of the semi-elliptical spring, and the main spring, respectively, and means carried by said spring structure and disposed upon the upper and lower sides of the snubber to limit the length of free spring in the snubber.

4. In a vehicle frame suspension a combination with the frame and a semi-elliptical spring disposed therebeneath, a rebound snubber comprising a spring member comprising complementary leaves converging and uniting at one end and lying in the same vertical plane with the semi-elliptical spring and the frame, the opposite ends of said rebound spring being pivotally connected to the pad of the semi-elliptical spring, and the main spring, respectively, means carried by said spring structure and disposed upon the upper and lower sides of the snubber to limit the length of free spring in the snubber, and means for adjustably varying the free length of spring in the snubber.

5. In combination with a vehicle frame and the frame supporting axle having a spring interposed between the axle and frame, said spring being adapted to yield to pressure exerted by said frame, means to quench rebound in said spring, said means comprising a plurality of leaf springs hingedly joined at their one end while the free end of one of said springs is in pivotal relation to said frame, and the free end of the other of said springs is in pivotal relation to said axle, a plurality of plates flanking the sides of said springs, means securing said plates to said springs, rollers interposed between said plates and lying in contact with said springs whereby spreading in response to rebound of said vehicle springs may be limited.

6. In combination with a vehicle frame and the frame supporting axle having a spring interposed between the axle and frame, said spring being adapted to yield to pressure exerted by said frame, means to quench rebound in said spring, said means comprising a plurality of leaf springs hingedly joined at their one end while the free end of one of said springs is in pivotal relation to said frame, and the free end of the other of said springs is in pivotal relation to said axle, a plurality of plates flanking the sides of said springs, means securing said plates to said springs, rollers interposed between said plates and lying in contact with said springs whereby spreading in response to rebound of said vehicle springs may be limited, and means to adjustably vary the position of said rollers on said springs and consequent variance in degree of spring rebound.

7. In a rebound check for vehicles having a spring supported chassis and axles, a plurality of leaf springs in hinged relation, the free end of one of said springs being pivoted to said chassis, the free end of the other of said springs being in pivoted relation to said axle whereby rebound in said spring will flex said leaf springs, a plurality of plates, one on each side of said spring in fixed relation thereto, a plurality of spring fulcrums positioned between said plates, one of said fulcrums being above one of said springs and the other fulcrum being below the other of said springs and means to adjustably vary the position of said plates whereby the fulcrum of said springs may be shifted in respect to the fixed points of support for said springs.

8. A vehicle frame suspension comprising a semi-elliptical spring bundle mounted upon a vehicle axle, said bundle having an upper main leaf terminating in spring eyes at its opposite ends, auxiliary springs carried by the opposite ends of said main leaf and extending toward the vertical median plane of said spring whereby the auxiliary springs may flex in the plane of the spring bundle, means pivotally connecting the forward spring eye with the vehicle frame, articulate means connecting the free end of the forward auxiliary spring with the spring bundle whereby free flexure of the spring bundle and auxiliary spring may be had as these members flex toward each other and limited flexure of said springs may be had as the main leaf rebounds, and means articulately attaching the opposite end of the spring bundle with relation to the vehicle frame.

9. A vehicle frame suspension comprising a semi-elliptical spring bundle mounted upon a vehicle axle, said bundle having an upper main leaf terminating in spring eyes at its opposite ends, auxiliary springs carried by the opposite ends of said main leaf and extending toward the vertical median plane of said spring whereby the auxiliary springs may flex in the plane of the spring bundle, means pivotally connecting the forward spring eye with the vehicle frame articulate means connecting the free end of the forward auxiliary spring with the spring bundle whereby free flexure of the spring bundle and auxiliary spring may be had as these members flex toward each other and limited flexure of said springs may be had as the main leaf rebounds, and means articulately attaching the opposite end of the spring bundle and its associated auxiliary spring with relation to the vehicle frame.

10. A vehicle frame suspension comprising a semi-elliptical spring bundle mounted upon a vehicle axle, said bundle having an upper main leaf terminating in spring eyes at its opposite ends, means pivotally connecting the forward spring eye to a vehicle frame, auxiliary springs, one carried by each end of the main leaf and extending substantially horizontally toward the vertical median line of the spring whereby said auxiliary leaves may flex in the plane of the spring bundle, means holding the free end of the forward auxiliary spring to cause the main leaf and said forward auxiliary spring to flex toward each other as load is being imposed upon the spring, and means confining the opposite end of the spring bundle and the free end of its associated auxiliary spring in articulate relation to the vehicle frame.

11. A vehicle frame suspension comprising a semi-elliptical spring bundle mounted upon a vehicle axle, said bundle having an upper main leaf terminating in spring eyes at its opposite ends, means pivotally connecting the forward spring eye to a vehicle frame, auxiliary springs, one carried by each end of the main leaf and extending substantially horizontally toward the vertical median line of the spring whereby said auxiliary leaves may flex in the plane of the spring bundle, means holding the free end of the forward auxiliary spring to cause the main leaf and said forward auxiliary spring to flex toward each other as load is being imposed upon the spring, and means confining the opposite end of the spring bundle and the free end of its associated auxiliary spring in articulate relation to the vehicle frame, said means including a re-curved end upon the auxiliary spring, a bracket upon the main frame extending downwardly upon opposite sides of the auxiliary spring and the main leaf having a cross member extending transversely beneath the spring bundle to limit the downward movement thereof, and a cross member extending above the free end of the auxiliary spring and in the re-curved portion thereof to limit the movement thereof.

THOMAS A. HOOVER.